United States Patent [19]

Lewis

[11] 4,386,537
[45] Jun. 7, 1983

[54] VARIABLE RATIO BRAKE PEDAL

[75] Inventor: Steven A. Lewis, London, Canada

[73] Assignee: Clark Equipment Company, Buchanan, Mich.

[21] Appl. No.: 189,507

[22] Filed: Sep. 22, 1980

Related U.S. Application Data

[63] Continuation of Ser. No. 950,205, Oct. 10, 1978, abandoned.

[51] Int. Cl.³ .............................................. G05G 1/14
[52] U.S. Cl. ...................................... 74/512; 74/516
[58] Field of Search ........................... 74/512, 516, 518

[56] References Cited

U.S. PATENT DOCUMENTS

| | | | |
|---|---|---|---|
| 1,754,354 | 4/1930 | Gans | 74/518 |
| 2,315,632 | 4/1943 | Martindill | 74/518 |
| 2,884,803 | 5/1959 | Willis | 74/512 |
| 3,142,199 | 7/1964 | Burton et al. | 74/516 |
| 3,646,831 | 3/1972 | Janosi | 74/518 |
| 3,678,779 | 7/1972 | Janosi | 74/516 |
| 3,798,995 | 3/1974 | Schroter | 74/512 |
| 3,810,400 | 5/1974 | Schroter | 74/518 |
| 3,911,760 | 10/1975 | Elbers et al. | 74/512 |
| 3,934,490 | 1/1976 | Schroter | 74/516 |
| 3,988,945 | 11/1976 | Fasana | 74/512 |
| 4,005,617 | 2/1977 | Sourbei et al. | 74/516 |
| 4,069,722 | 1/1978 | Derrick | 74/516 |
| 4,132,127 | 1/1979 | Fulmer | 74/512 |

FOREIGN PATENT DOCUMENTS 1262789 3/1968 Fed. Rep. of Germany ........ 74/512

*Primary Examiner*—Kenneth Dorner
*Attorney, Agent, or Firm*—Harry G. Thibault

[57] ABSTRACT

A variable ratio brake pedal mechanism providing a relatively short pedal stroke. A projection on a pivoted pedal lever bears on a second oppositely pivoted lever, providing conjoint movement of the two levers. A push rod brake actuator is pivotally connected to the second lever. The push rod and a portion of the second lever jointly form a toggle linkage which decreases the ratio of movement of the brake actuator relative to the pedal lever, and increases the mechanical advantage, as brake application occurs.

1 Claim, 4 Drawing Figures

VARIABLE RATIO BRAKE PEDAL

This application is a continuation of application Ser. No. 950,205, filed Oct. 10, 1978, and now abandoned.

BACKGROUND OF THE INVENTION

1. Field of the Invention

This invention relates to variable ratio brake pedal mechanisms which during initial movement of the brake pedal in a brake applying stroke operate with a high ratio of movement of the brake actuator relative to movement of the brake pedal and in the last part of the stroke operate with a low ratio between the same parts.

2. Description of the Prior Art

It is desirable to shorten the stroke or amount of movement of the pedal which is used to apply the brakes of motor vehicles, including highway vehicles and also larger off-the-road vehicles, and some users of such vehicles place limits on the amount of such pedal movement. A brake pedal with a short stroke has the advantages that the brakes can be applied more quickly and with a smaller amount of pedal movement by the operator.

In a typical hydraulic brake system there is lost motion in that most of the stroke of the brake pedal is required to fill up the brake hydraulic system from the master cylinder. The last part of the stroke of the brake pedal is utilized to pressurize the system and actually apply the brakes.

Prior patents have disclosed mechanisms intended to deal with the same problem, such as U.S. Pat. Nos. 1,754,354; 2,315,632; and 3,678,779. These patents and others utilize cams either separately or in conjunction with levers in variable ratio brake mechanisms.

It is known also to use toggle linkages in brake pedal mechanisms and examples of such linkages are disclosed in the U.S. Pat. Nos. 2,884,803 and 3,142,199.

SUMMARY OF THE INVENTION

This invention comprises a pivoted pedal lever associated with a second oppositely disposed pivoted lever. The second lever is pivoted adjacent the pedal lever and extends along the side of the pedal lever, and a projection on the pedal lever engages the second lever. The levers are arranged so that brake applying movement of the pedal lever causes the projection on the pedal lever to pivot the second lever with a varying lever arm. A brake actuator rod is pivotally connected to the variable lever, and such rod combines with a portion of the second lever to form a toggle linkage.

DESCRIPTION OF THE PREFERRED EMBODIMENT

Figure 1:
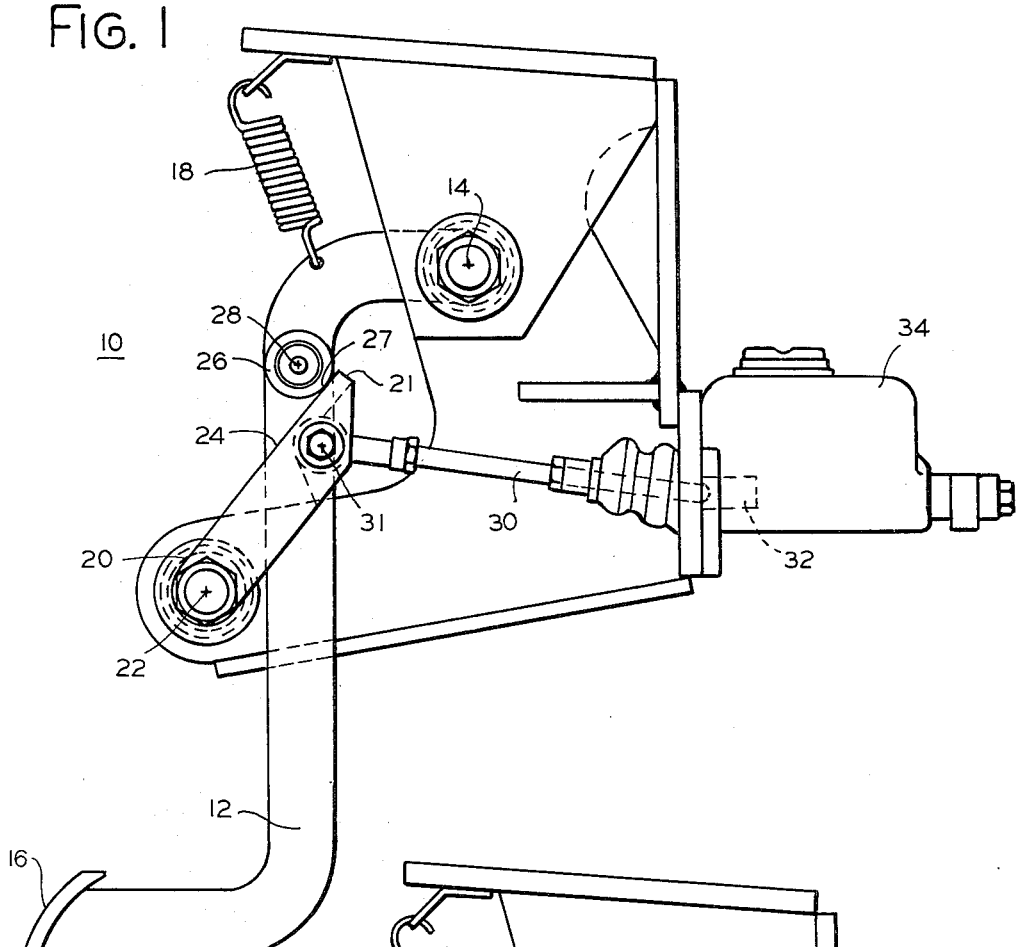
FIG. 1 of the drawing shows schematically a side elevation of the invention in the brake released position.

In all figures of the drawing the variable ratio brake pedal mechanism of this invention is indicated generally by the numeral 10. A pedal lever 12 is pivoted about an axis 14 and is provided with a pedal or wear portion at the bottom indicated by the numeral 16. A return spring for the lever 12 is indicated at 18.

A second, oppositely disposed lever 20 is pivoted about axis 22 and is arranged to extend alongside lever 12 with its distal end 21 toward pivot 14. Lever 20 has a flat upper surface 24 along which a roller 26 is operable to allow variations in the effective length of lever 20 to accommodate the conjoint movement of the two levers about different axes. Roller 26 is secured to the side of lever 12 about an axis 28.

A brake actuator or push rod 30 is pivotally connected to lever 20 about axis 31. The movement of rod 30 to the right operates the piston 32 of a master cylinder 34 and sufficient movement of such push rod and piston causes application of the hydraulic brakes.

Figure 2:
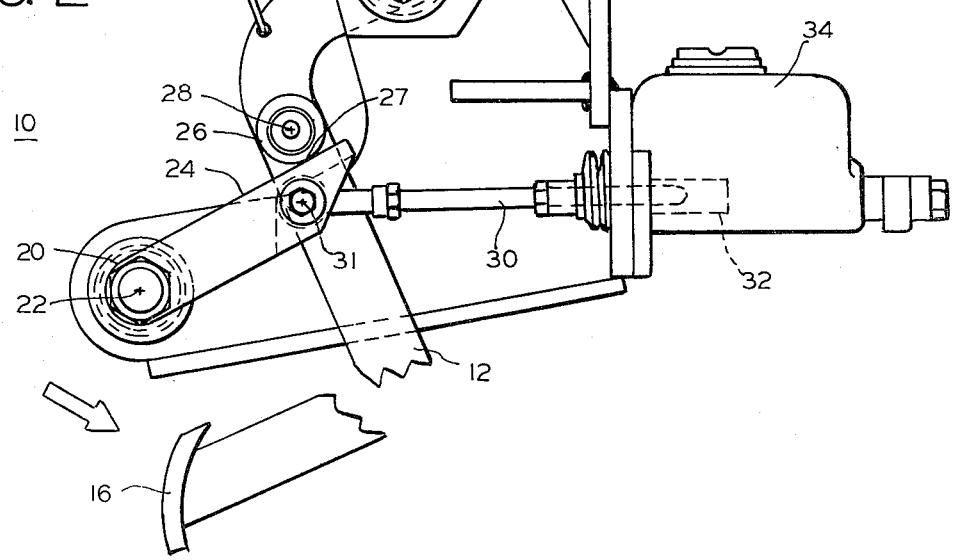
FIG. 2 shows the invention in the brake applied position.

FIG. 1 of the drawing shows the variable ratio brake pedal mechanism in the brake released position. When the operator's foot pivots the brake lever 12 counterclockwise by pushing pedal portion 16 to the right the mechanism ultimately arrives at the brake applied position which is illustrated in FIG. 2 of the drawing. Between the positions of FIGS. 1 and 2 the line of contact at 27 between roller 26 and lever 20 moves along surface 24, thus varying the effective length of lever 20. The movement of the two levers from the brake released position of FIG. 1 to the brake applied position of FIG. 2 provides a small increase in mechanical advantage and this is explained further hereinafter.

There is a much more pronounced change in the mechanical advantage during brake application as a result of the clockwise movement of lever 20 and the consequent movement of rod 30. It will be appreciated that rod 30 in combination with the portion of lever 20 between axes 31 and 22 comprises a toggle linkage. As such a linkage is moved toward a position in which the two toggle elements are in alignment the mechanical advantage increases. As the mechanical advantage of the mechanism 10 increases, the amount of movement of piston 32 relative to the amount of movement of pedal 16 decreases, and thus there is provided a brake pedal mechanism which at the outset of a brake application stroke provides a relatively large movement of the master cylinder piston for each increment of movement of the foot pedal and near the end of the stroke provides a relatively small movement of such piston for each increment of movement of the foot pedal.

Figures 3, 4:
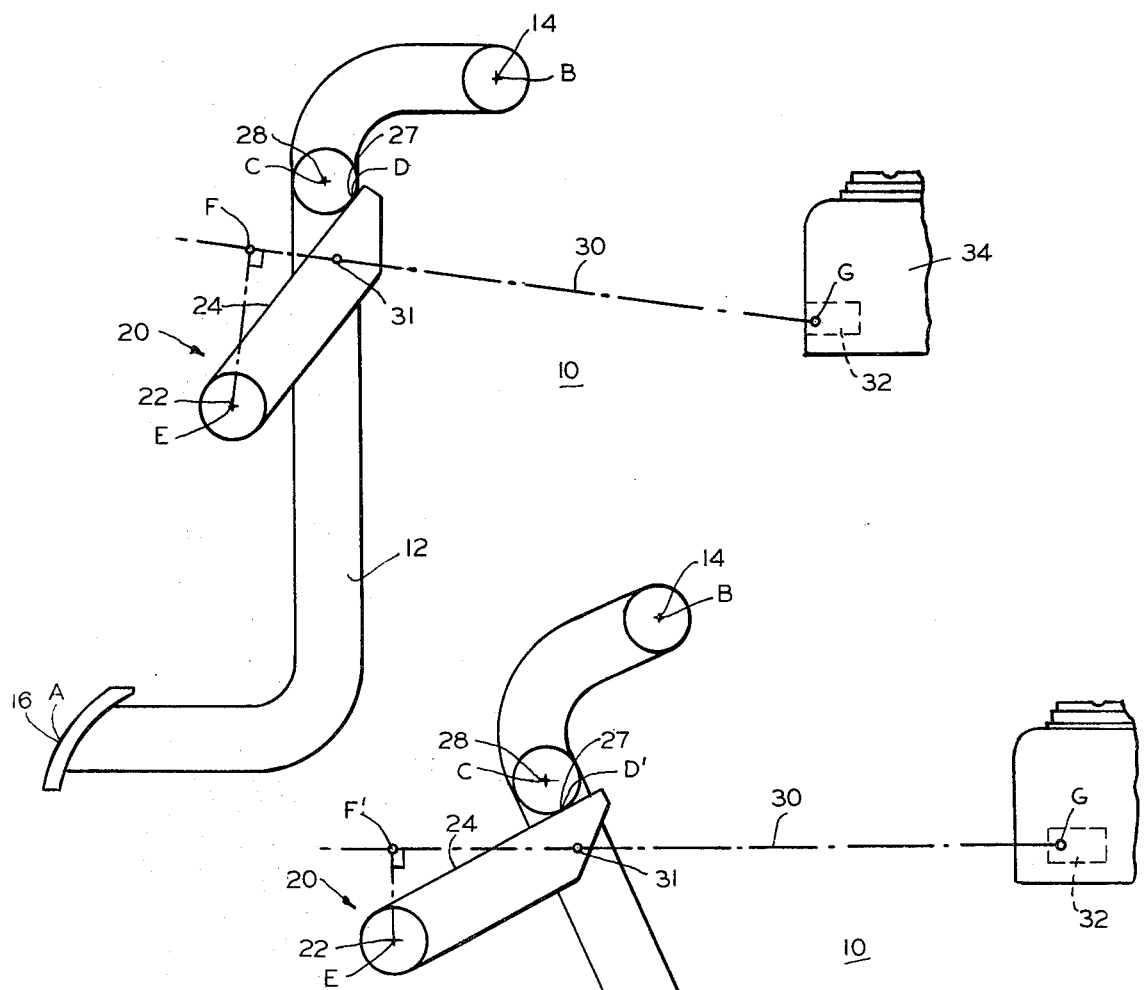
FIG. 3 is a diagram corresponding to FIG. 1.
FIG. 4 is a diagram corresponding to FIG. 2.

FIGS. 3 and 4 of the drawing illustrate diagrammatically the pedal mechanism of this invention in the same two positions as FIGS. 1 and 2 respectively. In FIGS. 3 and 4 letters have been assigned to various locations, some of which also have numbers applicable, in order to use such letters to indicate lengths or distances in developing a formula to show how the mechanical advantage is determined.

Referring to FIG. 3 of the drawing the mechanical advantage of the mechanism may be determined in accordance with the following. The mechanical advantage at D resulting from the two levers is determined as follows:

$$M.A. \text{ at } D = \frac{A - B}{B - C}$$

The torque about axis E is determined from the following:

$$\text{Torque about } E = \frac{A - B}{B - C} \times D - E$$

In order to determine the axial force on rod 30 (indicated also in FIGS. 3 and 4 as 31-G) the torque about E is divided by the distance E-F which is the distance from axis E to point F which is on a projection of 31-G, E-F being perpendicular to F-G.

The total mechanical advantage of the mechanism is indicated by the following formula:

$$M.A. = \frac{A-B}{B-C} \times \frac{D-E}{E-F}$$

As the brake pedal mechanism is moved from the unapplied or brake released position of FIG. 1 to the applied position of FIG. 2, two of the lengths in the above formula change and these are indicated in FIG. 4 which corresponds to FIG. 2, utilizing primes on the letters to indicate lengths which have changed from the unapplied position. Thus, in FIG. 4 D-E has changed to D'-E and E-F has changed to E-F'.

Accordingly, the formula for the total mechanical advantage at the brake applied position is indicated by the following:

$$M.A. = \frac{A-B}{B-C} \times \frac{D'-E}{E-F'}$$

It will be appreciated that D-E varies slightly during movement from the brake released to the brake applied position in order to allow both levers to pivot about their respective axes without restriction. It will be appreciated also that E-F varies greatly from the brake released to the brake applied position, such variation being a decrease. Such decrease results in a corresponding increase in the mechanical advantage and decrease in the ratio of movement of the brake actuator to the operator's foot pedal.

It will be understood that a toggle linkage provides increased axial force as the two legs of the toggle are moved toward the aligned position until theoretically at the time of alignment the axial force is infinite. The present invention utilizes the increase in axial force as the toggle linkage moves toward the aligned position but, of course, the aligned position is never reached. The geometry and spacing of the parts of the mechanism are such that it could not reach the aligned condition of the toggle linkage under any circumstances and thus could not go past the aligned position to an over-center condition from which the mechanism in the form illustrated would not return. The total change in mechanical advantage during brake application may be determined as the difference between the mechanical advantages according to the foregoing two formulae, the first indicating the mechanical advantage in the brake released condition of FIGS. 1 and 3, and the second the mechanical advantage in the brake applied condition of FIGS. 2 and 4.

It will be appreciated that the ratio of amount of movement of piston 32 relative to the amount of movement of pedal 16 varies inversely with the mechanical advantage and that the disclosed brake pedal mechanism provides for a relatively high ratio of movement at the start of a brake application stroke and a relatively low ratio near the end of the stroke. The total travel of the brake pedal to apply the brakes is considerably less than would be the case if push rod 30 were connected to and operated directly by brake lever 12.

While there has been described and illustrated herein the best mode now contemplated for carrying out this invention it will be appreciated that modifications may be made by those skilled in the art. Accordingly, it should be understood that I intend to cover by the appended claims all such modifications falling within the true spirit and scope of my invention.

I claim:

1. A variable ratio brake pedal mechanism comprising:
a pivoted pedal lever pivotable about a first axis,
a second oppositely disposed pivoted lever mounted adjacent the pedal lever and having opposite ends,
a forward end of the second lever disposed in front of the pedal lever and a rear end disposed behind the pedal lever, the forward end pivotable about a second axis parallel to and adjacent to the first axis, the second axis also forward of the pedal lever, the second lever extending adjacent the pedal lever with a rear portion thereof engaging a brake push rod receivable in a brake cylinder, the push rod pivotably connected to the rear portion of the second lever to form a toggle linkage between the second axis and the brake cylinder, the rear end of the second lever extending rearward of the toggle link connection between the second lever and the push rod, a cam surface on the second lever extending between the rear end of the second lever and the toggle link connection and cam engaging means on said pedal lever engageable with the cam surface of said second lever to provide a varying lever arm as the pedal lever is engaged and the cam engaging means engages the cam surface of the second lever to pivot said second lever with a varying lever arm and drive the toggle linkage toward an aligned position as the brake pedal mechanism moves toward a brake applied position, thereby to create a substantial mechanical advantage as the cam engaging means moves along the cam surface from the rear end of the second lever to the toggle link connection between the second lever and the brake push rod.

* * * * *